United States Patent [19]

Maroney

[11] 3,812,969
[45] May 28, 1974

[54] APPARATUS FOR FLUID TREATMENT
[75] Inventor: William J. Maroney, Williston Park, N.Y.
[73] Assignee: Sybron Corporation, Rochester, N.Y.
[22] Filed: Oct. 16, 1972
[21] Appl. No.: 297,602

[52] U.S. Cl.............. 210/274, 210/275, 210/290, 210/410
[51] Int. Cl............................................. B01d 23/16
[58] Field of Search....... 210/80, 82, 274, 275, 279, 210/410, 411, 412

[56] References Cited
UNITED STATES PATENTS

| | | | |
|---|---|---|---|
| 630,988 | 8/1899 | Reisert | 210/274 X |
| 1,794,841 | 3/1931 | Elfreth | 210/275 X |
| 1,951,917 | 3/1934 | Leslie | 210/279 |
| 2,268,076 | 12/1941 | Lawlor | 210/410 X |

Primary Examiner—Samih N. Zaharna
Assistant Examiner—Robert G. Mukai
Attorney, Agent, or Firm—Theodore B. Roessel; James A. Rich

[57] ABSTRACT

Apparatus for treating fluid in which the fluid is passed through a bed of solid particles, such as filter media or ion exchange resins, is provided with improved means for supporting the bed and improved means for backwashing the bed. The apparatus includes an outer vessel having a closed bottom and an inner vessel having an open bottom. The inner vessel is positioned above the bottom of the outer vessel. Thus, there is an opening between the inner vessel and the bottom of the outer vessel. The bed of solid particles is supported by the bottom of the outer vessel and extends up into at least one of the vessels. The bed covers the opening between the inner vessel and the bottom of the outer vessel. An inlet conduit admits fluid to one of the vessels and the fluid passes down through the bed and through the opening into the other vessel. Since the bed is supported by the outer vessel, expensive support paraphernalia such as underdrains and strainers are not required. Preferably, at least one of the vessels has a closed top, and an outlet conduit communicates with this vessel at an intermediate level. Thus, fluid accumulates in the vessel with the closed top and a pocket of air is trapped above the accumulated fluid. The outlet conduit includes means for restricting the flow of fluid from the vessel so that the trapped air is compressed. The bed is backwashed by reducing pressure on the inlet side of the bed, whereby the compressed air forces the accumulated fluid back through the bed and through a backwash outlet conduit communicating with the other vessel above the bed. During the backwash cycle, air may be withdrawn from the pocket of compressed air and injected into the bed, so that a mixture of air and fluid will pass through the bed and scour the particles.

7 Claims, 2 Drawing Figures

PATENTED MAY 28 1974 3,812,969

APPARATUS FOR FLUID TREATMENT

BACKGROUND OF THE INVENTION

This invention relates to fluid treatment and more particularly to an apparatus wherein the fluid being treated passes through a bed of solid particles.

In many fluid treating processes, such as filtration, ion exchange and the like, fluid is passed through a bed of solid particles. Typically, the bed is supported by a false bottom, or underdrain, containing a number of strainers which allow the fluid to pass through while preventing passage of the solid particles. These underdrains, strainers and the like add a considerable amount to the cost of constructing the unit. Also, underdrains and strainers can and frequently do fail; causing loss of expensive filter media, ion exchange resins or the like; damaging down stream equipment; and requiring extensive repairs.

Another disadvantage of most prior art units of this type is that some means must be provided for forcing fluid back through the bed at a relatively high rate when the bed is backwashed. Typically, this is done by using a supply pump with a high capacity or by storing the backwash fluid in a tall tank to provide a gravity head. This also adds to the cost of the unit.

An alternative method of backwashing is to utilize air pressure to force fluid back through the bed. Units utilizing this method of backwashing are illustrated in U.S. Pat. Nos. 1,088,929 — Reisert, 1,871,122 — Kretzschmar and 3,533,507 — Aitken. However, since these units require some means of supplying air, they are at least as expensive as other prior art units.

SUMMARY OF THE INVENTION

It is an object of this invention to provide an improved apparatus for treating fluids wherein the fluids are passed through a bed of solid particles.

A further object of this invention is to provide apparatus for treating fluids by passing the fluid through a bed of solid particles that eliminates the need for underdrains, strainers or other expensive means for supporting the bed.

This invention provides apparatus including an outer vessel having a closed bottom and an inner vessel having an open bottom. The inner vessel is positioned above the bottom of the outer vessel. Thus, there is an opening between the inner vessel and the bottom of the outer vessel. A bed of solid particles is supported by the bottom of the outer vessel and extends up into at least one of the vessels. The bed covers the opening between the inner vessel and the bottom of the outer vessel. An inlet conduit communicates with one of the vessels above the bed. The fluid being treated passes down through the bed and through the opening into the other vessel.

Yet another object of this invention is to provide an apparatus for backwashing a bed of solid particles in which trapped air is utilized to provide a high flow rate during backwashing. This is accomplished by providing at least one of the vessels with a closed top and a fluid outlet conduit which communicates with this vessel at an intermediate level, and passing the fluid being treated through the bed and into the vessel with the closed top. Fluid accumulates in the outer vessel and a pocket of air is trapped above the accumulated fluid. The outlet conduit includes means for restricting the flow of fluid from the vessel with the closed top. As a result, the pocket of air is compressed. The bed is backwashed by reducing the pressure on the inlet side of the bed. The compressed air trapped in the closed vessel forces the accumulated fluid in the vessel with the closed top through the bed and through a backwash outlet conduit which communicates with the other vessel above the bed. Preferably, the fluid outlet conduit is opened to the atmosphere for part of the backwash cycle to add air to the pocket. This permits the backwash to proceed to the fullest possible extent and replaces any air that has been dissolved in the accumulated fluid.

Other objects and advantages of this invention will be apparent from the following description.

DRAWINGS

FIGS. 1 and 2 are partially sectioned elevation views of two embodiments of this invention.

DETAILED DESCRIPTION

Figures 1, 2:
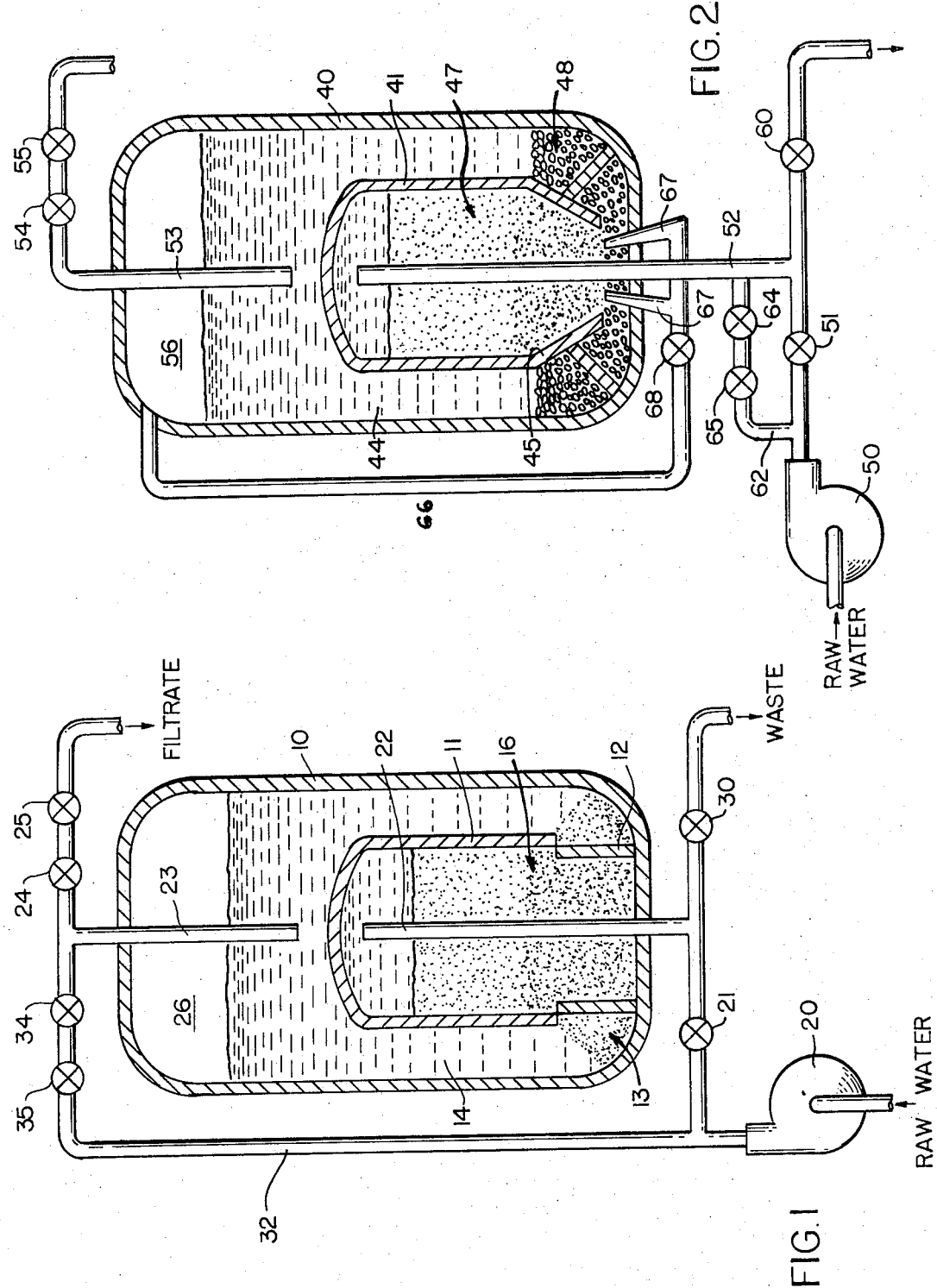

FIG. 1 illustrates a sand filter embodying this invention. The filter includes an outer vessel 10 and an inner vessel 11, both of which have closed tops. The inner vessel, which has an open bottom, is positioned above the bottom of the outer vessel by a plurality of legs 12 so that there is an opening 13 between the inner vessel and the bottom of the outer vessel and an annular space 14 between the inner vessel and the outer vessel.

A bed 16 of sand or other filter media is supported by the bottom of the outer vessel and extends up into the inner vessel. Thus, bed 16 covers the opening 13 between the inner vessel and the bottom of the outer vessel. Since the bed is supported by the outer vessel, no underdrains, strainers or the like are required and the cost of building the unit is reduced.

During the service cycle, i.e., when filtered fluid is being discharged from the filter, the fluid to be treated, such as raw water, is pumped through an inlet valve 21 and through an inlet conduit 22 which extends in through the inner vessel 11 above the bed 16 of filter media. The raw water passes down through the bed 16 and through the opening 13 into the outer vessel 10. The flow rate of the raw water should be adjusted, e.g., through valve 21 or by changing the speed of pump 20, so that the velocity of the water up through the annular space 14 between the inner and outer vessel is below the settling rate of the last solid particles that the fluid contacts in the bed. Otherwise, the particles in the bed 16 may be carried up through the annular space 14 with the filtered water.

The filtered water is discharged through an outlet conduit 23 that extends into the outer vessel 10 to a level intermediate the bottom and the top of the outer vessel. As a result, filtered water accumulates in the outer vessel and a pocket of air 26 is trapped above the accumulated fluid. The outlet conduit 23 contains means, such as a valve 24 or orifice, for restricting the flow of fluid through the conduit. Preferably, a second valve 25 is also provided so that the setting of valve 24 need not be disturbed. Since valve 24 restricts the flow of fluid from the outer vessel 10, pressure builds up in this vessel, and the pocket of air at the top of the vessel is compressed. This compressed air is subsequently used in backwashing the bed.

When the bed becomes clogged with impurities, valves 21 and 25 are closed and a backwash outlet valve 30 is opened. This reduces the pressure on the inlet side of bed 16, and the compressed air 26 in the outer vessel forces the accumulated fluid in the outer vessel back through the bed, through the inlet conduit 22, which doubles as a backwash outlet conduit, and through the backwash outlet valve 30. The head provided by the compressed air provides a high rate of flow during the first part of the backwash cycle. Thus, the need for high capacity pumps, tall storage tanks, or external sources of air is eliminated.

Preferably, an air break is provided in the outlet conduit 23 downstream from valve 25 so that air can be added to the pocket 26 in the outer vessel by opening valve 25 when the pressure in the outer vessel has fallen to atmospheric pressure. This prevents a vacuum from developing in the outer vessel during the backwash cycle and allows a syphon to develop in the inner vessel and backwash outlet conduit, thereby permitting the backwash cycle to continue further, and also replaces any air which has gone into solution or been lost in other ways such as through leaks.

In some cases, it may be desirable to close valve 25 and cut off flow through the outlet conduit 23 for a short period before reducing the pressure on the inlet side of the bed. This eliminates any losses through pressure drop in the bed or in the inlet lines and, with certain types of pumps, causes the pump discharge pressure to increase. Thus, the pressure in the outer vessel 10 will increase and the air in pocket 26 will be further compressed.

In some cases, for example where the length of the service cycle is longer than the period needed to compress the air in pocket 26 to the desired amount, it may be desirable to permit unrestricted flow of fluid through the outlet conduit 23 during a portion of the service cycle. This reduces the pressure needed to force the water through the bed and thereby reduces the load on pump 20. Unrestricted flow can be accomplished by opening valve 24 wide for the desired portion of the service cycle or providing another valve which by-passes valve 24.

When backwashing has been completed, valve 30 is closed and the outer vessel is filled with fluid once again. This can be done by opening inlet valve 21 or by allowing fluid to flow through a by-pass line 32 and through the outlet conduit 23 into the outer vessel. This latter mode of operation is preferred when opening valve 21 before fluid had accumulated in the outer vessel would provide an undesirably high rate of flow.

The by-pass line 32, like the outlet line, contains one valve 35 which can be turned on and off easily; and another valve 34 which provides accurate control of the flow through the line. Thus, the by-pass line can be used to control the rate at which fluid is supplied before the desired amount of fluid has accumulated in outer vessel 10. The by-pass line also provides a way to by-pass the entire filter assembly.

Another method of by-passing the inlet valve is illustrated in FIG. 2. In this embodiment, the by-pass line 62 is connected in parallel with inlet valve 51 between the supply pump 50 and the inlet conduit 52. Since this piping system is simpler than the one shown in FIG. 1, it is generally preferable. The by-pass line 62, like the by-pass line 32 in FIG. 1, contains one valve 65 for opening and closing the line and another valve 64 for controlling the rate of flow through the line.

The embodiment illustrated in FIG. 2 also differs from the embodiment illustrated in FIG. 1 in the type and arrangement of the bed of solid particles, and in the shape of the inner vessel. In FIG. 2, the bed comprises a layer 47 of sand and a layer 48 of gravel, coarser sand or other media having a higher settling rate than the sand in layer 47. The water being filtered passes first through the layer of sand 47 and then through the other layer 48. Since the last media that the water contacts has a higher settling rate, this arrangement increases the velocity at which water can be passed up through the annular space 44 between the outer vessel 40 and the inner vessel 41 without danger of dislodging the bed. As long as the flow rate up through the annular space 44 is kept below the settling rate of the media in layer 48, the sand in layer 47 will not be dislodged even if the flow rate up through the annular space exceeds the settling rate of the sand.

In FIG. 2, the gravel extends up into the annular space while the sand extends up into the inner vessel. This arrangement provides the maximum room for the sand. However, in some cases it may be preferable to simply deposit a layer of gravel at the bottom of the inner vessel and deposit the sand on top of the gravel.

The inner vessel 41 of the filter in FIG. 2 is provided with a inwardly tapered bottom section 45, such as a truncated, inverted cone. Thus, during backwashing water flows up through the center of the sand layer at a high rate. This tends to create vortex currents that circulate and scour the sand.

The filter in FIG. 2 is also provided with an air scouring line 66 which leads from the air pocket 56 in the outer vessel 40 to the filter bed. During backwashing, a valve 68 in line 66 is open and air from pocket 56 is injected, through nozzles 67, into the filter bed. Thus, a mixture of air and water passes up through the bed. The air, in bubbling up through the bed, provides a scrubbing action which achieves the same effect as washing at higher flow rates. Thus, air scouring yields better cleaning with less water.

The air pocket 56 in FIG. 2 provides the head needed to achieve high backwash flow rate and also provides the air for scouring. Since the air is provided without any air compressor or other external source of compressed air, these features are provided much more economically than in prior art units.

In FIG. 2, the air scouring nozzles 67 are arranged so that the air passes through the sand 47 but not through the gravel 48. Generally, this method of operation is preferable because air scouring has very little effect on the washing of the gravel. However, if desired the nozzles can be arranged so that the air passes through both layers. Other modifications which may be made to the embodiments disclosed above will be apparent to those skilled in the art. For example, the air scouring system of FIG. 2 can be utilized in the system shown in FIG. 1. Also, the liquid being treated can be fed into the outer vessel and passed through the bed into the inner vessel instead of vice versa. This invention may also be used in other fluid treating systems in which the fluid is passed through a bed of solid particles, such as water softeners, ion exchange units and the like, as well as in sand or sand and gravel filters. These and other modifications may be made within the scope of this invention, which is defined by the following claims.

I claim:

1. Apparatus for treating a fluid comprising:
an outer vessel having a closed bottom;
an inner vessel having an open bottom, said inner vessel being positioned within the outer vessel and above the bottom of the outer vessel so that there is an annular space between the inner vessel and the outer vessel and an opening between the inner vessel and the bottom of the outer vessel;
a bed of solid particles supported by the bottom of the outer vessel, said bed comprising a layer of material having a lower settling rate extending up into the inner vessel and a layer of material having a higher settling rate extending up into said annular space;
an inlet conduit that communicates with the inner vessel above the bed, whereby the fluid being treated passes down through the material in the inner vessel and up through the material in the annular space; and
means for keeping the velocity of the fluid up through the annular space below the settling rate of the material having a higher settling rate.

2. Apparatus according to claim 1 wherein the material having a lower settling rate comprises sand and the material having a higher settling rate comprises gravel or coarser sand.

3. Apparatus according to claim 1 wherein:
the outer vessel has a closed top;
a fluid outlet conduit communicates with the outer vessel at an intermediate level; and
the fluid being treated passes through the bed into the outer vessel, whereby fluid accumulates in the outer vessel and a pocket of air is trapped above the accumulated fluid; including:
means in the outlet conduit for restricting the flow of fluid from the outer vessel, whereby the pocket of air is compressed; and
a backwash outlet conduit communicating with the inner vessel above the bed, whereby the compressed air forces the accumulated fluid through the bed and out the backwash outlet conduit during a backwash cycle.

4. Apparatus according to claim 3 wherein the lower portion of the inner vessel is tapered inwardly.

5. Apparatus according to claim 4 wherein the lower portion of the inner vessel comprises a truncated inverted cone.

6. Apparatus according to claim 3 including an air scouring line leading from said pocket of compressed air to said bed and means for controlling the flow of air through said air scouring line.

7. Apparatus according to claim 3 including means to add air to said pocket through the fluid outlet conduit during part of the backwash cycle.

* * * * *